United States Patent Office 3,335,276
Patented Aug. 8, 1967

3,335,276
APPARATUS FOR HIGH PRECISION MEASURING OF A RADIATION FLUX COMPOSED OF GAMMA RAYS AND FAST NEUTRONS
Joseph Louis Chatelet, Paris, and Fulvio Romano, Fresnes, France, Edouard Calvet, 22 Blvd. d'Arras, Marseille, France, and Jean Cordier, Marseille, and Jean Rene Puig, Versailles, France; said Chatelet, said Romano, said Cordier, and said Puig, assignors to said Calvet
Filed Nov. 20, 1963, Ser. No. 324,946
Claims priority, application France, Nov. 20, 1962, 916,026
6 Claims. (Cl. 250—83.1)

The invention relates to apparatus for, inter alia, the separate measuring, with great precision, of the gamma ray flux and the rapid neutron flux, especially in the vicinity of the core of a swimming pool type reactor.

According to the invention a calorimetric dosimeter is provided for the measuring of ionizing radiations including the following components: a hollow cylindrical casing open at both ends, plugs to seal the casing providing in the casing a sealed housing, a multiplicity of superimposed paired cells in the housing, each pair comprising a receiving cell, whose body contains a receiving nucleus made of material the heating of which under the effect of radiation must be measured and a compensating cell, the body of which contains a receiving nucleus made of a material the heating of which is relatively low and already known under the effect of the studied radiations; in each receiving cell a calibration resistance is placed in a housing provided in the axis of the cell; inset washers which isolate the cells from each other and the end cells from the sealing plugs; between each cell and the casing, and coaxial therewith a shell surrounding the aforesaid cell; detecting elements such as thermojunctions placed between each cell and the surrounding shell, and electrical connections to join up first the calibration resistances to a source of current, and secondly the thermojunctions to a measuring apparatus.

The invention also covers the following characteristics including their various possible combinations:

A calorimetric dosimeter is diagrammatically illustrated by way of example in the accompanying drawing, in which.

Figure 1:
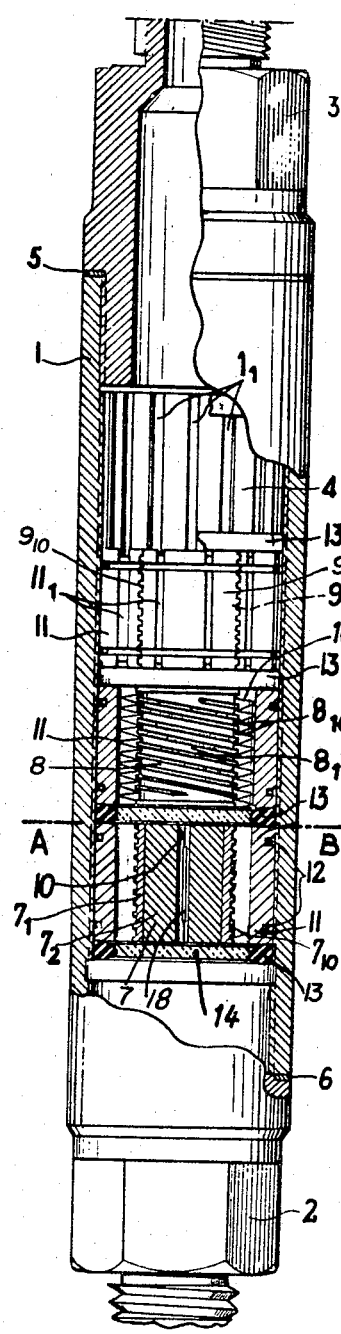
FIGURE 1 is a part sectional front view of a dosimeter according to the invention.
Figure 2:
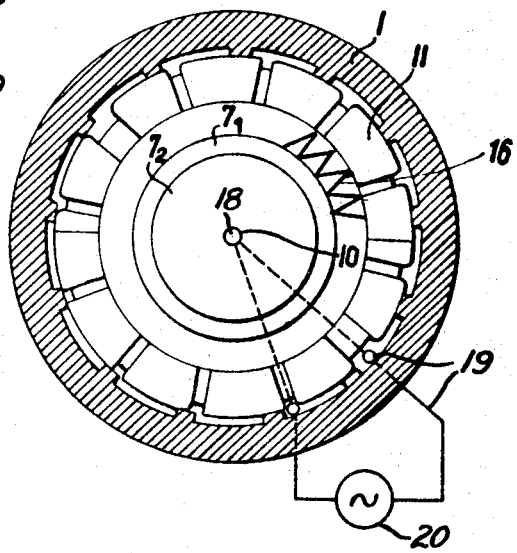
FIGURE 2 is a sectional view looking downwardly from the cutting line AB of FIGURE 1.

According to the invention the calorimetric dosimeter shown in FIGURES 1 and 2 comprises mainly a hollow cylindrical casing 1 sealed at both ends by plugs 2 and 3 defining within the casing 1 a housing 4 the sealing of which is assured, in an outward direction, as for example, through sealing joints 5 and 6.

In housing 4, four cells are superimposed; only three of them 7, 8 and 9 are numbered in FIGURE 1.

In this procedure with four cells, the middle cells 8 and 9 are compensating cells and the end cells, namely cell 7 and the cell that is not shown, are receiving cells. All these cells comprise a body $7_1$, $8_1$, $9_1$ containing, as far as the receiving cells are concerned, a nucleus ($7_2$ for cell 7) made of a material the heating of which is measured under the effect of radiation, and the body of the compensating cells comprises a material the heating of which is relatively low and known under the effect of the studied radiation, air for example.

Among these cells, only the so-called receiving cells are provided with an axial aperture receiving a heating resistance 18 which permits the calibration of the dosimeter.

Additionally each of the cells is surrounded with a shell 11 made of two parts or half-shells secured to each other by means of joint 12, the external surface of the shells resting on the internal face of cylindrical housing 1 and more precisely on terminal faces $1_1$, fitted with grooves on the interior face of the casing.

Each cell and the corresponding shell are thermically insulated from the adjacent cell or plug by means of inert washers 13, fitted with windows 14, made of insulating material such as quartz.

Figure 3:
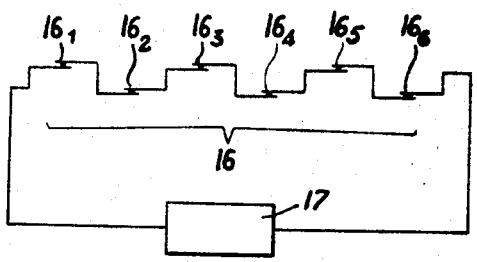
FIGURE 3 is a front view of the construction of the thermojunctions capable of being used in the dosimeter according to the invention.

Furthermore, the bodies $7_1$ $8_1$ $9_1$ . . . of each cell are provided on their external face with a helicoidal screwthread and in the bottom of the threads $7_{10}$ $8_{10}$ $9_{10}$, a temperature detector 16 is lodged. Each of these detectors may be of the kind partially shown in FIGURE 3, that is to say, may comprise a thread of Chromel and Alumel in a ribbon shape, welded and folded as a Greek key pattern. The welds have the same surface as the upper and lower sides of the pattern, the surfaces being for example in contact as far as the odd numbered welds $16_1$, $16_3$, $16_5$ are concerned, with the internal face of the half-shells, and as far as the even numbered welds $16_2$, $16_4$, $16_6$ are concerned, with the thread bottom of each cell body. The thermojunctions 16, which constitute the only thermal contact between detectors and the calorimeter or measuring apparatus 17, surround and ensure furthermore the support of the cells they surround in relation to the internal sides of corresponding shells 11.

The electrical connections of the dosimeter, namely the outputs of thermojunctions and calibration resistances, are placed in the longitudinal grooves $11_1$ provided on the external faces of shells 11, the electrical connections being shown as wires 19. Preferably and additionally, one of the two sealing plugs of the dosimeter (plug 3 in the embodiment of FIGURE 1) is joined to a rod, not shown, the extremity of which is integral with a junction box. From this box cables connect to a measuring apparatus 17 for the outputs of thermojunctions and to a source of current 20 for the calibration resistances.

According to the method of the invention, the cylindrical casing 1, the bodies $7_1$ $8_1$ $9_1$ . . . of the cells, the shells 11 and the plugs 2 and 3 are made of an aluminium-magnesium of nuclear purity, called A9G3. Joints 5 and 6 placed between casing 1 and plugs are made of pure aluminium, just the the integral rod of plug 3.

The surfaces of the cylindrical casing 1, the exterior surfaces of the cell bodies and the shell surfaces are preferably covered with an anodic alumina deposit.

The casing may have an external diameter of 20 mm. and a length of 70 mm. It contains four superimposed cells of 7.4 mm. in diameter and 10 mm. in height.

The end receiving cells may contain, the one a nucleus of graphite and the other a lead nucleus, and the middle cells contain air.

The cylindrical casing may have an internal diameter of 16 mm. grooved to a height of about 50 mm.; the inner face of the casing may comprise 16 grooves 0.8 mm. wide, the surface of contact between the cylinder and the shells being about one fifth of their lateral surface. The dimensions of the shells are preferably as follows: 10.4 mm. high, 16 mm. external diameter, and about 12 mm. internal diameter.

Each half-shell may comprise on its external face six longitudinal throats, 10 mm. high and 0.5 x 0.5 mm. in section, open at the top and at the bottom towards the internal face of the shell.

The insert washers have the same internal and external diameters as the half-shells and their height is approximately 1.65 mm. The quartz windows have a diameter of about 13.5 mm. and a thickness of about 0.15 mm.

The apertures 10 may contain an alumina tube pierced with holes through which passes the calibration resistance, Joule effect. Dimensions are about 1.5 mm. diameter of the hole, 1.4 mm. diameter and 10 mm. length of the alumina tube, which will preferably hold seven holes for the passage of the resistance.

The body of each cell may have the following approximate dimensions: height 10 mm., internal diameter 7.4 mm., external diameter 9 mm., the screwthreading being provided on its external surface with a square thread of 1 mm. x 0.5 mm. in section.

Thermojunctions have the following approximate dimensions: thickness of ribbon 0.15 mm., width 0.80 mm., height of Greek key-pattern 2 mm., space of said key-pattern 2 mm.

Finally the output of the thermojunctions and calibration resistances is realised in the calorimeter with Alumel threads 0.24 mm. in diameter, the threads being joined in the junction box to 0.64 mm. threads insulated with polythene.

The apparatus according to the invention presents the special advantage of needing only a casing of reduced volume, since in fact the isothermic environment it rests in is used as a thermic guide to define the temperature of the casing. It is therefore sufficient, in order to obtain exact measurements, to ensure that the temperature of the environment should not vary too rapidly.

Other advantages of the calorimetric dosimeter, according to the invention, are:

The very low time constant it offers, as well as the fact that it can be calibrated through self-contained resistances;

Its particularly cared for holding to flux of neutrons over a long period, electrical and thermic insulations being assured through metallic oxides;

Its robustness, light weight and small size;

The possibility of measuring simultaneously several components of the radiation field;

The possibility of integrating in time the dosage outputs corresponding to each of the components and to obtain either the total absorbed dosage or the energy produced by the reactor.

In a procedure comprising one cell with a lead nucleus and one cell with a graphite nucleus, the gamma radiation and the flux of rapid neutrons in the vicinity of the core of a swimming pool type reactor can be measured separately, with great precision.

The sensitiveness of the apparatus allows the measurement for each of its components of a radiation flux providing an absorption of energy amounting to between 1 milliwatt per gram and 5 watts per gram within the receiving material, the measurement being made by means of a registering potentiometer with a sensitiveness of 1 millivolt for all scales.

The following degrees of sensitiveness have been measured with this apparatus, to mention only a few:

On the lead cells a sensitiveness of 50 microvolts per milliwatt per gram of lead;

On the graphite cell a sensitiveness of 8 microvolts per milliwatt per gram of graphite.

Furthermore the apparatus according to the invention offers a very reduced time constant, semi-deviation times being from 17 to 26 seconds respectively for the above-mentioned cells.

An apparatus as described can be used in the following way: after being calibrated by use of the resistances 10, the apparatus is placed in the reactor.

A nucleus as $7_2$, is heated by the flux to be measured, in opposition to the air of the cell 8. The produced heat is conducted to the exterior by the detectors 16. At constant load, the current produced by the detectors 16 is measured. This current is proportional to the heat flux, then to the flux to be measured, since the detectors of cells 7 and 8 are connected in opposition.

The invention is not restricted to the described and illustrated methods. Other methods and other forms of operation may be carried out without departing from the scope of the invention.

What is claimed is:

1. A calorimetric dosimeter for measuring ionizing radiation, comprising:
    an elongated hollow housing;
    a plurality of pairs of cells arranged in superposed relation in said housing, each pair of cells consisting of a receiving cell and a compensating cell, each cell comprising a body containing a nucleus, the nucleus of the receiving cell being made of a material capable of generating a relatively large amount of heat when subjected to said radiation and the nucleus of the compensating cell comprising a material which is heated to a relatively low and known level when subjected to said radiation, the receiving cell having a coaxial aperture for receiving a calibration resistance;
    a shell surrounding and spaced from each of said cells;
    insert washers disposed between said cells for insulating the cells from each other;
    temperature detecting means disposed in the space between each cell and its associated shell and in thermal contact therewith, the temperature detecting means being connected to a measuring apparatus and the calibration resistances being connected to a source of current.

2. A calorimetric dosimeter according to claim 1, in which the housing is comprised of a hollow cylindrical casing open at both ends, and including plugs for sealing the ends of the casing.

3. A dosimeter according to claim 1, in which each shell comprises two half-shells held one against the other by means of rings, the half-shells having a multiplicity of longitudinal grooves for the passage of connections.

4. A dosimeter according to claim 2, in which at least part of the internal face of the cylindrical casing is provided with grooves, thus reducing the area of contact between casing and the shells.

5. A dosimeter the according to claim 1, in which the external surface of each cell body is provided with a screw-thread in the bottom of which thermojunctions are wound.

6. A dosimeter according to claim 1, in which the housing contains four cells, the two end cells being receiving cells one of which contains graphite as the nucleus material and the other of which contains lead as the nucleus material, and two middle cells contain air as the nucleus material.

References Cited

UNITED STATES PATENTS 2,814,731　11/1957　Werme et al. _____ 250—83.1
3,033,985　5/1962　Petree _____ 250—83.3

FOREIGN PATENTS 1,339,822　9/1963　France.

ARCHIE R. BORCHELT, *Primary Examiner.*